US009809087B2

(12) United States Patent
Nakayama

(10) Patent No.: US 9,809,087 B2
(45) Date of Patent: Nov. 7, 2017

(54) FOREIGN OBJECT OBSTRUCTION DEVICE

(75) Inventor: David Takeo Nakayama, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 1075 days.

(21) Appl. No.: 12/275,768

(22) Filed: Nov. 21, 2008

(65) Prior Publication Data

US 2010/0130116 A1  May 27, 2010

(51) Int. Cl.
*B60H 1/24* (2006.01)
(52) U.S. Cl.
CPC .................. *B60H 1/248* (2013.01)
(58) Field of Classification Search
CPC ...................................... B60H 1/24
USPC ......................... 454/151, 162, 164
See application file for complete search history.

(56) References Cited

U.S. PATENT DOCUMENTS

| 4,460,205 A * | 7/1984 | Glance | 293/120 |
| 4,667,578 A * | 5/1987 | Hagenah | 454/164 |
| 5,139,304 A * | 8/1992 | Tajiri | 293/117 |
| 5,167,573 A * | 12/1992 | Kanno et al. | 454/164 |
| 5,364,142 A * | 11/1994 | Coiner | 293/117 |
| 5,904,618 A * | 5/1999 | Lewis | 454/162 |
| 6,347,989 B1 | 2/2002 | Marko et al. | |
| 6,439,991 B1 | 8/2002 | Jarnot | |
| 6,468,149 B2 | 10/2002 | Essig et al. | |
| 7,310,963 B2 | 12/2007 | Crocker | |
| 2002/0056985 A1* | 5/2002 | Szakurski | 280/848 |
| 2002/0164943 A1* | 11/2002 | Misner | 454/164 |

FOREIGN PATENT DOCUMENTS

JP    2003034128 A  *  2/2003

OTHER PUBLICATIONS

Ventiilation Duct with Heat Stacked Cover—4 Runner/Lexus GX.
Ventilation Duct with Snorkel Shaped Walls—Tundra.

* cited by examiner

*Primary Examiner* — Steven B McAllister
*Assistant Examiner* — Samantha Miller
(74) *Attorney, Agent, or Firm* — Dinsmore & Shohl LLP

(57) ABSTRACT

A foreign object obstruction device for preventing foreign objects from entering into the vent of a vehicle without completely obstructing the air passage of the vent is provided. The foreign object obstruction device extends between the a rear vehicle bumper and the vehicle body, and includes a rigid panel mounted to the vehicle body, generally beneath the vent so as to present a generally horizontal planar surface. The foreign object obstruction device may also include a stand-off structure extending from the rigid panel to the vehicle body so as to maintain the foreign obstruction device a predetermined distance from the vent, and a resilient pad disposed between the stand-off structure and the vehicle body so as to help absorb the force caused by objects being hurled into the device; and between the rigid panel and the bumper so as to form a seal.

5 Claims, 4 Drawing Sheets

FOREIGN OBJECT OBSTRUCTION DEVICE

FIELD OF THE INVENTION

The present invention relates to a foreign object obstruction device for preventing foreign objects from entering into a vent.

BACKGROUND OF THE INVENTION

In motor vehicles, air vents allow air from the interior of the vehicle to escape. For instance, when the vehicle windows are closed, and the vehicle's air conditioning is operating, a positive pressure is produced in the interior of the vehicle, and the vent allows for the pressure to escape into the environment. Since the vents allow for air to escape, devices and apparatuses for preventing unwanted foreign objects from entering into the ventilation ducts while still maintaining air flow are well known and documented. For instance, U.S. Pat. No. 6,468,149 teaches a vent having louvers to prevent water from outside of the vehicle from entering into the vehicle compartment. However, in certain instances water and other foreign object can still pass through the louver, especially when the surrounding body structure creates turbulent air flow, as is the case in a vehicle quarter ventilation duct.

The vehicle quarter ventilation duct is positioned in the lower rear portion of certain vehicles behind a tire. The force from the rotation of the tire along with the movement of the vehicle relative to the road creates a turbulent air pattern as indicated by the arrows in FIG. 1. In certain vehicle operating conditions, such as when the windows are closed and the air conditioning is on, the turbulent air pattern can cause foreign debris to pass through the duct into the interior vehicle compartment. Air flow is made even more turbulent when a muffler is disposed adjacent the rear tire as the air flow created by the rotation of the tire is forced to travel around the muffler as shown by the arrows in FIG. 1. The air flow may carry water, debris, and other foreign objects through the louver into the ventilation duct unless the ventilation duct is completely sealed off. However, sealing off the ventilation duct during such driving conditions may not be desirable as certain passengers like having air circulate within the vehicle cabin. For instance, on hot days, vehicle passengers may desire to have the air conditioning on, thus the vent must be open to allow air to exit. Thus it is desirable to have a device which can prevent foreign objects from entering into the vents without completely blocking the vent so as to maintain air flow.

SUMMARY OF THE INVENTION

A foreign object obstruction device for preventing foreign objects from entering into the quarter ventilation duct of a vehicle without completely obstructing the air passage of the vent is provided. The foreign object obstruction device extends between the inner surface of a rear vehicle bumper and a vehicle body. The foreign object obstruction includes a rigid panel mounted to the vehicle body and disposed on the vehicle body beneath the vent. The rigid panel extends outwardly towards the inner surface of the rear vehicle bumper so as to present a generally horizontal planar surface. The rigid panel includes a free edge spaced apart from the rear vehicle bumper, and a resilient pad is disposed between the free end and the inner surface of the rear vehicle bumper so as to form a seal between the panel and the inner surface of the rear vehicle bumper.

The foreign object obstruction device may also include other elements so as to facilitate the prevention of foreign objects from entering the vent, such as a stand-off structure extending from the rigid panel to the vehicle body so as to maintain the foreign obstruction device a predetermined distance from the vent. A resilient pad may be disposed between the stand-off structure and the vehicle body so as to help absorb the force caused by objects being hurled into the device.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENTS

Referring to the Figures, wherein like numerals indicate corresponding parts throughout the several views, a foreign object obstruction device 10 extending between the inner surface of a rear vehicle bumper 12 and a vehicle 14 body so as to prevent foreign objects from entering through a vent 16 and into the vehicle cabin under certain operating conditions is provided. The foreign object obstruction device 10 may be made of a material having a predetermined tensile strength sufficient to withstand force of air currents and flying debris created by the rotation of the tire and the movement of air out of the vent 16, such as a hardened polymer, steel, fiberglass, or the like.

Figure 1:
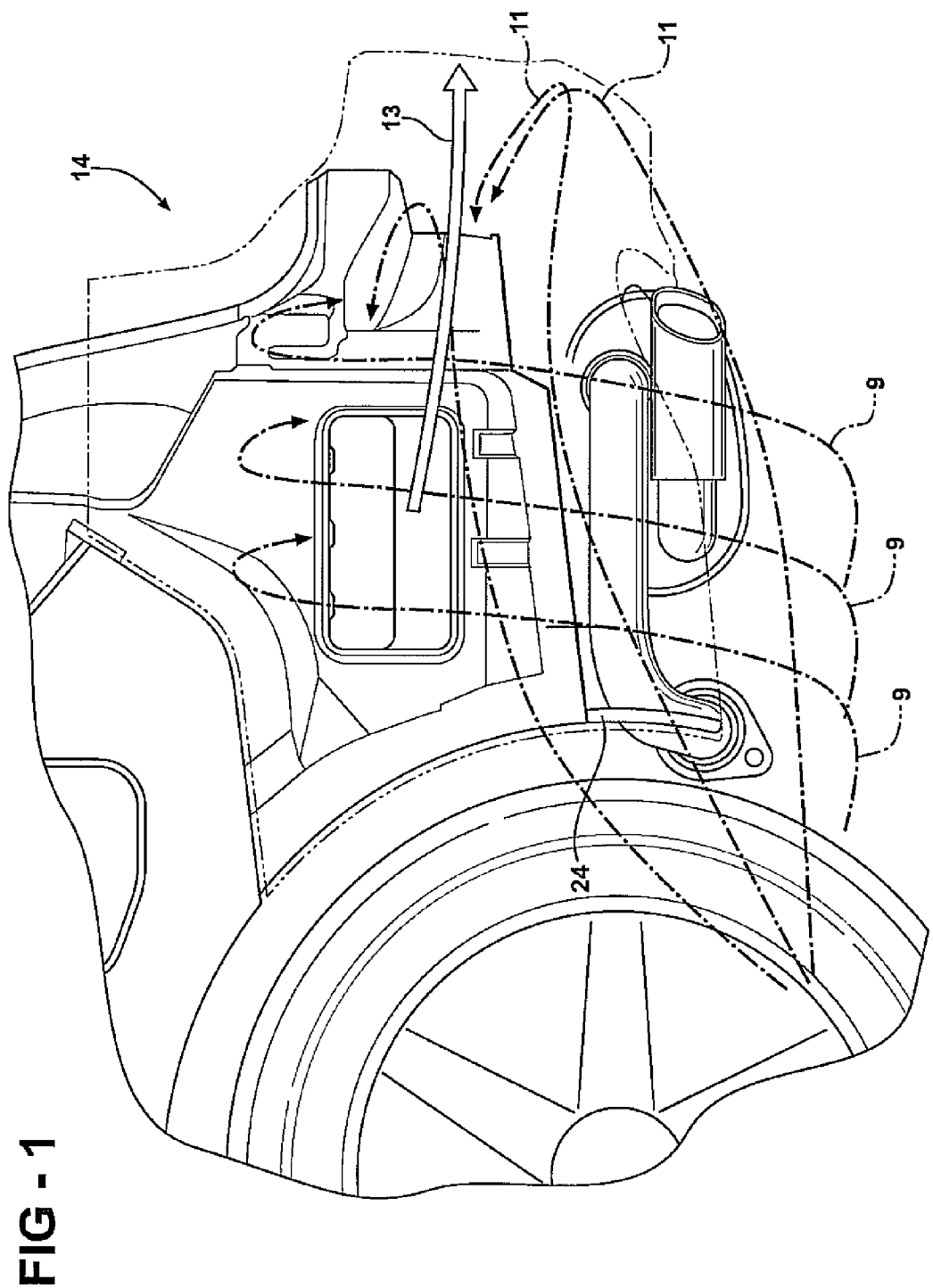
FIG. 1 is perspective view taken from the side of a vehicle not equipped with a foreign object obstruction device, the vehicle is moving through a pool of standing water and arrows 9, 11, and 13 show the various paths of air flowing in the vicinity of a vent, arrows 11 show air moving around a muffler, arrows 9 shows a circular air pattern caused by the rotation of the tire and the surrounding vehicle body structure, arrow 13 shows air flow moving out of the vent.

With reference to FIG. 1, a view of a vehicle 14 not equipped with the foreign object obstruction device 10 is shown driving through standing water. The vehicle 14 has a vent 16 disposed in the rear of the vehicle 14, generally behind the tire and above a muffler 15. The vent 16 shown in FIG. 1 is commonly referred to by those skilled in the art as a quarter ventilation duct 16. As shown, the muffler body 15 extends across the width of the vehicle 14 and creates a barrier for which air flow indicated by arrows 11 caused by the rotation of the tire must pass. Additionally, the rotation of the tires may cause the air to flow in a generally circular pattern as indicated by arrows 9. Thus, it is evident that the air flow created by movement of the tire and the vehicle body structure 14 surrounding the vent 16 may cause water or objects such as stones (collectively referred to herein as foreign objects) to enter into the vehicle cabin through the vent 16 under certain operating conditions. Specifically, foreign objects may enter into the vehicle cabin through the vent 16 when the windows are closed and the air conditioning is on.

The vent 16 allows for the exit of air between the inner chamber of the vehicle 14 and the environment via a duct as indicated by arrows 13, thus foreign objects may also enter the interior chamber of the vehicle 14 causing potential water damage to the interior of the vehicle 14 or otherwise causing discomfort to the vehicle 14 occupants. Accordingly, it is desirable to have a device which prevents foreign objects from passing through the vent 16 while at the same time allowing air to pass of the vent 16 unobstructed.

The foreign object obstruction device 10 includes a rigid panel 18 extending between the vehicle 14 body and the inner surface of the rear vehicle bumper 12. The rigid panel 18 is mounted to the vehicle 14 body and disposed beneath the vent 16. Specifically, the rigid panel 18 extends outwardly from the vehicle 14 body towards the inner surface of the rear vehicle bumper 12 to a free edge 20 and presents a generally horizontal planar surface. The rigid panel 18 includes a forward edge 22 aligned along the forward opening of the vent 16 such that the forward edge 22 of the rigid panel 18 is spaced apart from a rear liner 24 of the vehicle 14 body. This allows air to enter into the space defined between the rigid panel 18 and the vehicle 14 body so as to facilitate the exit of air from the vent 16 as indicated by arrow 13. At least one resilient pad 26 is disposed between the free edge 20 of the rigid panel 18 and the inner surface of the rear vehicle bumper 12 so as to form a seal between the rigid panel 18 and the inner surface of the rear vehicle bumper 12. In the preferred embodiment, the pad 26 is made of foam or rubber.

Figure 2:
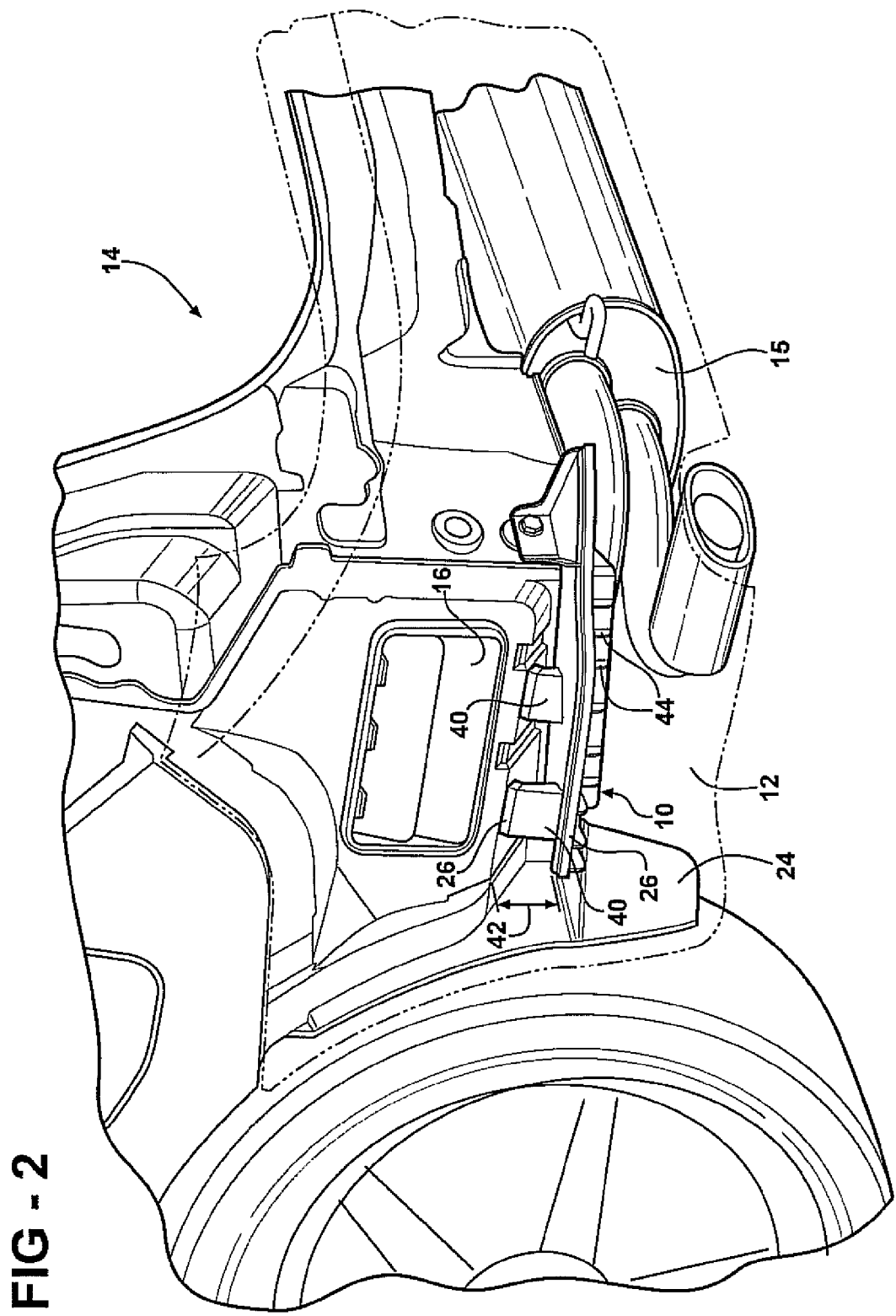
FIG. 2 is the same view of FIG. 1, showing the foreign object obstruction device disposed generally beneath the vent, the vehicle rear bumper is indicated by the dashed lines, the foreign object obstruction device is shown extending along a generally horizontal plane from a predetermined portion of the vehicle body structure to the vehicle rear bumper.
Figure 3:
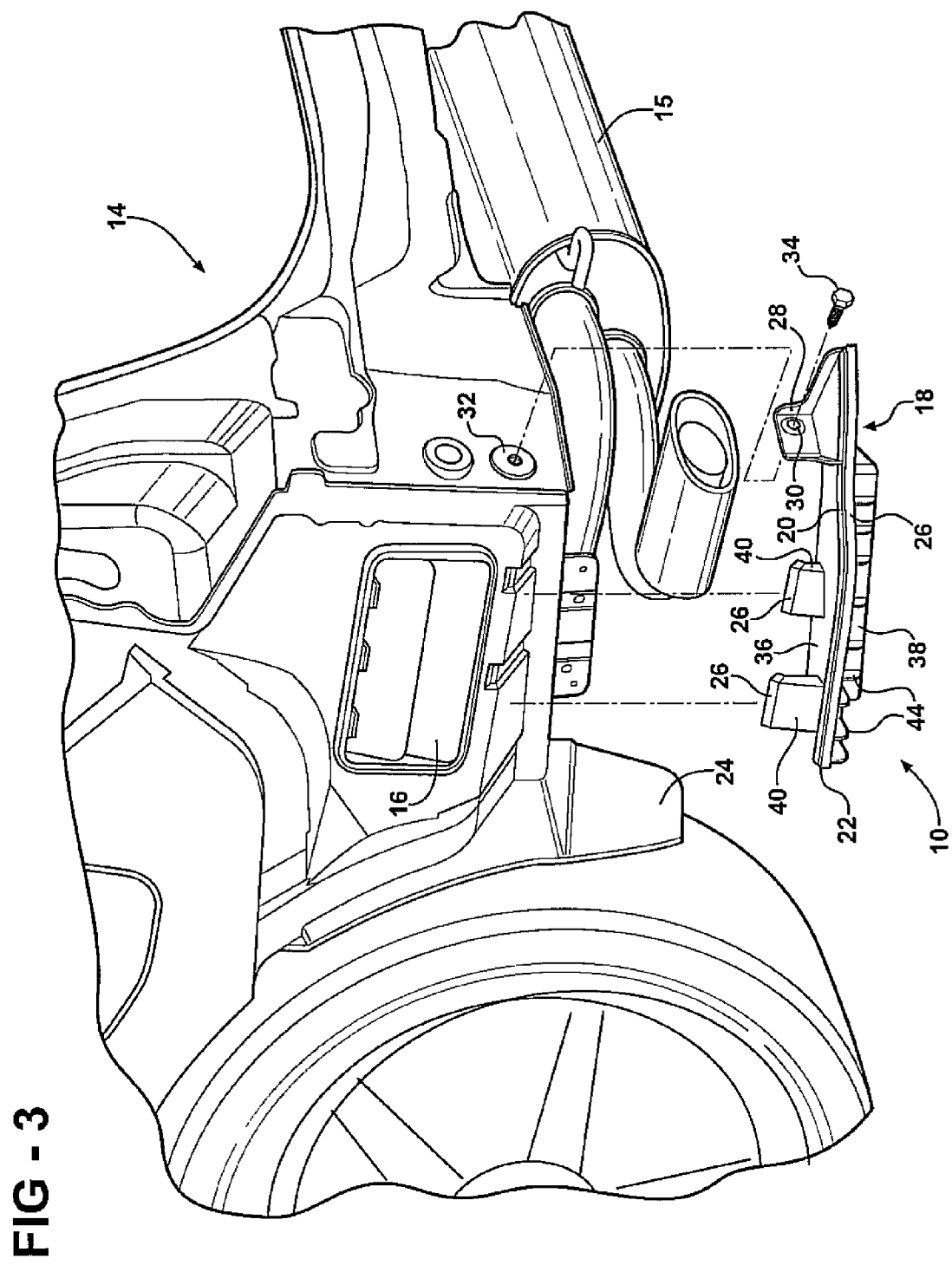
FIG. 3 is an exploded view of the foreign object obstruction device and the general area of the vent.

With reference now to FIGS. 2 and 3, the foreign object obstruction device 10 may include other features which further enhance the obstruction capabilities of the device. For instance, the foreign object obstruction device 10 may include at least one mounting portion 28 for mounting the foreign object obstruction device 10 to the vehicle 14 body. The mounting portion 28 extends from the rigid panel 18 and is generally orthogonal thereto. The mounting portion 28 is integral to the foreign object obstruction device 10. In the first preferred embodiment, the mounting portion 28 includes an aperture 30 registered to a tab 32 on the vehicle body structure 14. The tab 32 may be threaded so that a bolt 34 may threadedly engage the tab 32 so as to secure the device to the vehicle body structure 14. However, it is understood that the means by which the mounting portion 28 is fixed to the vehicle body structure 14 is not critical to the scope and spirit of the device. Accordingly, other means such as vibrational welding, adhesives, or a screw may be used to secure the foreign object obstruction device 10 to the vehicle body structure 14.

The rigid panel 18 may further include a first surface 36 opposite a second surface 38, wherein the first surface 36 is facing the vent 16. The foreign object obstruction device 10 may further include at least one stand-off structure 40 extending from the first surface 36 to the vehicle 14 body. The stand-off structures 40 help maintain the rigid panel 18 a predetermined distance 42 from the quarter ventilation duct 16. Thus the stand-off structures 40 help the foreign object obstruction device 10 withstand the force of air currents and flying debris created by the rotation of the tire, and prevents the rigid panel 18 from obstructing the vent 16.

A resilient pad 26 may be mounted to the free end of each stand-off structure 40 to help absorb the impact of the force of air currents and flying debris created by the rotation of the tire, thereby further helping the stand-off structure 40 to maintain its shape.

With reference again to FIG. 3, the foreign object obstruction device 10 may also include a plurality of ribs 44 disposed on the second surface 38 for providing structural support to the rigid panel 18. As shown, the ribs 44 project outwardly from the second surface 38 and expand across entire underside of the rigid panel 18. Thus the ribs 44 help the rigid panel 18 from bending and warping under the force of air currents and flying debris created by the rotation of the tire.

Figure 4:
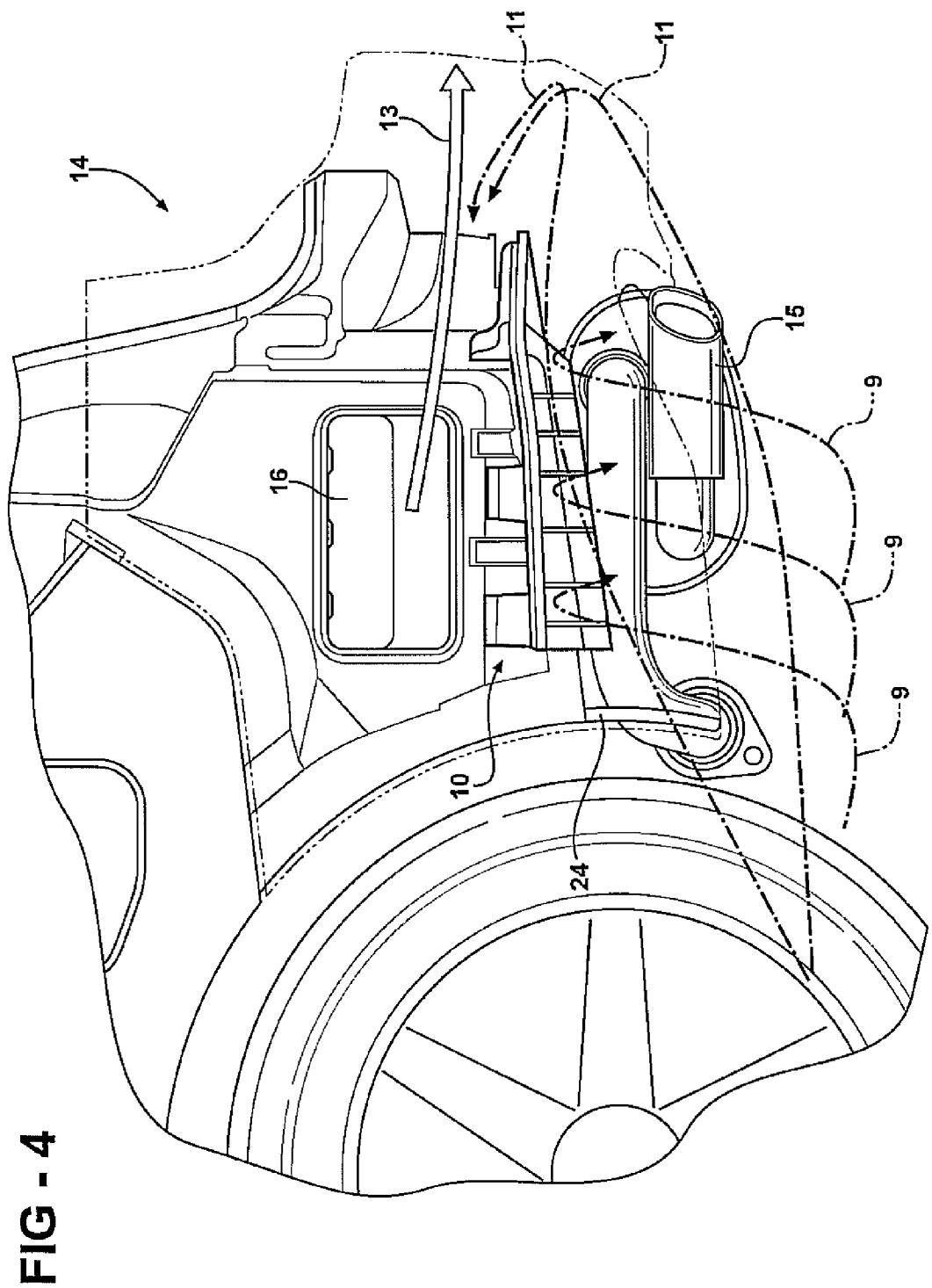
FIG. 4 is a view of a vehicle equipped with the foreign object obstruction device, as shown the device restricts the pattern of air flow as indicated by arrows 11 and 9 without obstructing the air flow of the vent as indicated by arrow 13.

With reference now to FIG. 4, the operation of the foreign obstruction device in a vehicle 14 is shown. The foreign obstruction device prevents air from carrying foreign objects into the vehicle 14 vent 16 while at the same time allowing for air to enter and exit the vent 16 as indicated by arrow 13. The foreign object obstruction device 10 does this by preventing debris from being carried along arrows up into the vent 16 and diverts the current indicated by arrow up and past the pathway of vent 16 air as indicated by arrow. Specifically, the placement of the rigid panel 18 is such that it interconnects a portion of the vehicle 14 body below the vent 16 to the inner surface of the rear vehicle bumper 12. The device includes pads 26 to help form a seal between the rigid panel 18 and the rear vehicle bumper 12, and to absorb shock between the stand-off structures 40 and the rigid panel 18. Furthermore, a plurality of ribs 44 may be disposed on the second surface 38 of the rigid panel 18 so as to help maintain the integrity of the rigid panel 18 under forces of flying objects and debris.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:
1. A vehicle comprising:
   a vehicle body;
   a quarter ventilation duct, the quarter ventilation duct having an opening;
   a rear vehicle bumper; and
   a foreign object obstruction device comprising:
      a rigid panel having a generally horizontal planar surface extending between a proximal edge and a free edge, the proximal edge fixedly mounted to the vehicle body, the rigid panel separate from and disposed beneath the quarter ventilation duct, the rigid panel extending between an outer surface of the quarter ventilation duct and an inner surface of the rear vehicle bumper;
      a resilient pad, the resilient pad is pinched by the free edge of the rigid panel and the inner surface of the rear vehicle bumper;
      a stand-off structure, the stand-off structure extending from the rigid panel to the vehicle body placing the rigid panel along a horizontal plane beneath the quarter ventilation duct, the stand-off structure maintaining the rigid panel a predetermined distance from the quarter ventilation duct, the resilient pad disposed between the stand-off structure and the vehicle body, the rigid panel and the resilient pad blocking air flow from reaching the opening of the quarter ventilation duct so as to prevent objects from entering the quarter ventilation duct.

2. The vehicle as set forth in claim 1 wherein the pad is comprised of a material selected from the group consisting of foam and rubber.

3. The vehicle as set forth in claim 1 further including at least one mounting portion for mounting the foreign object obstruction device to the vehicle.

4. The vehicle as set forth in claim 1 wherein the rigid panel further includes a first surface opposite a second surface so that the first surface faces the quarter ventilation duct.

5. The vehicle as set forth in claim 4 wherein the second surface includes a plurality of strengthening ribs, the plurality of strengthening ribs extending across the second surface.

\* \* \* \* \*